(12) United States Patent
Buravalla et al.

(10) Patent No.: US 11,486,349 B2
(45) Date of Patent: Nov. 1, 2022

(54) METHODS FOR MANUFACTURING BLADE STRUCTURES

(71) Applicant: General Electric Company, Schenectady, NY (US)

(72) Inventors: Vidyashankar Ramasastry Buravalla, Bangalore (IN); Paul Mathew, Bangalore (IN); Sriram Krishnamurthy, Bangalore (IN)

(73) Assignee: General Electric Company, Schenectady, NY (US)

( * ) Notice: Subject to any disclaimer, the term of this patent is extended or adjusted under 35 U.S.C. 154(b) by 173 days.

(21) Appl. No.: 16/739,244

(22) Filed: Jan. 10, 2020

(65) Prior Publication Data

US 2021/0215132 A1    Jul. 15, 2021

(51) Int. Cl.
*F03D 1/06*      (2006.01)

(52) U.S. Cl.
CPC .... *F03D 1/0675* (2013.01); *F05B 2280/1074* (2013.01); *F05B 2280/401* (2013.01); *F05B 2280/4003* (2013.01); *F05B 2280/5006* (2013.01)

(58) Field of Classification Search
None
See application file for complete search history.

(56) References Cited

U.S. PATENT DOCUMENTS

| | | | |
|---|---|---|---|
| 4,613,102 A * | 9/1986 | Kageorge | B64D 15/166 244/134 A |
| 5,686,003 A | 11/1997 | Ingram et al. | |
| 5,804,276 A * | 9/1998 | Jacobs | B32B 15/02 428/110 |
| 7,300,708 B2 | 11/2007 | Gigliotti, Jr. et al. | |
| 7,669,799 B2 * | 3/2010 | Elzey | B32B 15/011 244/123.12 |
| 8,974,884 B2 * | 3/2015 | Fabre | F01D 5/16 428/67 |
| 9,157,139 B2 | 10/2015 | Ragagopalan | |
| 9,970,303 B2 * | 5/2018 | McGuire | B64C 11/205 |
| 11,046,415 B1 * | 6/2021 | Pankonien | B64C 3/24 |
| 2006/0018761 A1 * | 1/2006 | Webster | F01D 7/00 416/233 |
| 2011/0189014 A1 | 8/2011 | Hiller | |

(Continued)

FOREIGN PATENT DOCUMENTS

| | | |
|---|---|---|
| CN | 102400718 A | 4/2012 |
| CN | 108005848 A | 5/2018 |

OTHER PUBLICATIONS

Lockney, Metalworking Techniques Unlock a Unique Alloy, NASA Technology Transfer Program, Spinoff, 3 Pages. https://spinoff.nasa.gov/Spinoff2015/ip_4.html.

(Continued)

*Primary Examiner* — Kayla McCaffrey
(74) *Attorney, Agent, or Firm* — Dority & Manning, P.A.

(57) ABSTRACT

A method for manufacturing a blade structure includes providing the blade structure comprising an outer surface having an aerodynamic profile. The method also includes applying one or more shape memory alloys to the outer surface of the blade structure so as to form an outer protection layer on at least a portion of the blade structure. Moreover, the method includes securing the one or more shape memory alloys to the blade structure.

16 Claims, 9 Drawing Sheets

(56) References Cited

U.S. PATENT DOCUMENTS

| | | |
|---|---|---|
| 2011/0255974 A1 | 10/2011 | Nanukuttan et al. |
| 2012/0134838 A1 | 5/2012 | Jimenez et al. |
| 2013/0068888 A1* | 3/2013 | Smith .................... F01D 5/282 |
| | | 244/124 |
| 2015/0083281 A1 | 3/2015 | Lipkin et al. |
| 2016/0327020 A1* | 11/2016 | Tobin .................... F03D 1/0675 |
| 2017/0010338 A1 | 1/2017 | Bayat et al. |
| 2018/0245202 A1 | 8/2018 | Gorokhovsky et al. |

OTHER PUBLICATIONS

Naresh et al., Shape Memory Alloys: A state of art review, IOP Conference Series, Materials Science and Engineering, vol. 149, Sep. 2016, 14 Pages. https://iopscience.iop.org/article/10.1088/1757-899X/149/1/012054/meta.

European Search Report for EP Application No. 20217866.1, dated May 6, 2021.

\* cited by examiner

METHODS FOR MANUFACTURING BLADE STRUCTURES

FIELD

The present disclosure relates in general to blade structures, such as wind turbine rotor blades, and more particularly to a method for manufacturing an outer skin of a blade structure.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves.

The spar caps are typically constructed of various materials, including but not limited to glass fiber laminate composites and/or carbon fiber laminate composites. The shell of the rotor blade is generally built around the spar caps of the blade by stacking outer and inner layers of fiber fabrics in a shell mold. The layers are then typically infused together, e.g. with a thermoset resin.

Methods for manufacturing rotor blades may also include forming the blades in segments. The blade segments may then be assembled to form the rotor blade. For example, some modern rotor blades, such as those blades described in U.S. patent application Ser. No. 14/753,137 filed Jun. 29, 2015 and entitled "Modular Wind Turbine Rotor Blades and Methods of Assembling Same," which is incorporated herein by reference in its entirety, have a modular panel configuration. Thus, the various blade components of the modular blade can be constructed of varying materials based on the function and/or location of the blade component.

Conventional rotor blades made of certain composite material may be prone to environmental degradation such as erosion, cavitation etc. due to exposure to rain, ice, hail, and sand particle impact. Conventional rotor blades are also prone to foreign object impact damage caused by the impact from sources such as birds, stones, or other projectiles.

As such, the present disclosure is directed to methods for manufacturing a blade structure, such as a wind turbine rotor blade, having on outer protective layer that includes a shape memory alloy.

BRIEF DESCRIPTION

Aspects and advantages of the invention will be set forth in part in the following description, or may be obvious from the description, or may be learned through practice of the invention.

In one aspect, the present disclosure is directed to a method for manufacturing a blade structure. The method includes providing the blade structure comprising an outer surface having an aerodynamic profile. The method also includes applying one or more shape memory alloys to the outer surface of the blade structure so as to form an outer protection layer on at least a portion of the blade structure. Moreover, the method includes securing the one or more shape memory alloys to the blade structure.

In one aspect, the present disclosure is directed to a rotor blade structure for a wind turbine. The rotor blade structure includes a rotor blade having an outer surface that defines an aerodynamic profile. Further, the rotor blade structure includes an outer protection layer formed of one or more shape memory alloys. Thus, the outer protection layer is adhered to at least a portion of the outer surface of the rotor blade so as to protect the outer surface of the rotor blade. It should be understood that the rotor blade structure may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

While material and mechanical design solution exist for mitigating damage to rotor blades, many of these solutions are expensive and also suffer from poor performance when it comes to protecting rotor blade structures from environmental hazards. Furthermore, many material and mechanical solutions can be expensive, and thus are not suitable for scalable production of rotor air blade structure.

Generally, the present disclosure is directed to methods for manufacturing blade structures that require applying one or more shape memory alloys to at least a portion of the outer surface of the blade structure. As such, the shape memory alloys contained in a coating or other suitable sheet and can be used to prevent or resist erosion, corrosion, and cavitation of the blade structure, either partially or entirely. In other words, the shape memory alloys can be applied to a chordwise segment or to cover the complete chordwise direction, but just a portion of the rotor blade in the radial direction. In further embodiments, only portions of the rotor blade may be covered with the shape memory alloys (such as the tip portion and/or the leading edge).

Furthermore, the shape memory alloys as described herein can be used to protect the blade structure from foreign object damage, while providing other desirable features on the outside surface of the blade structure. Moreover, the shape memory alloy coatings described herein may be lighter in weight than other conventional layers or coatings use, thus offering enhanced performance benefits. Thus, the methods described herein provide many advantages not present in the prior art. For example, the methods of the present disclosure provide the ability to easily protect the blade structure from environmental degradation and foreign object impact damage. Additionally, the methods provided herein may be provided at reduced costs and are readily scalable for industrial production methods.

Figure 1:
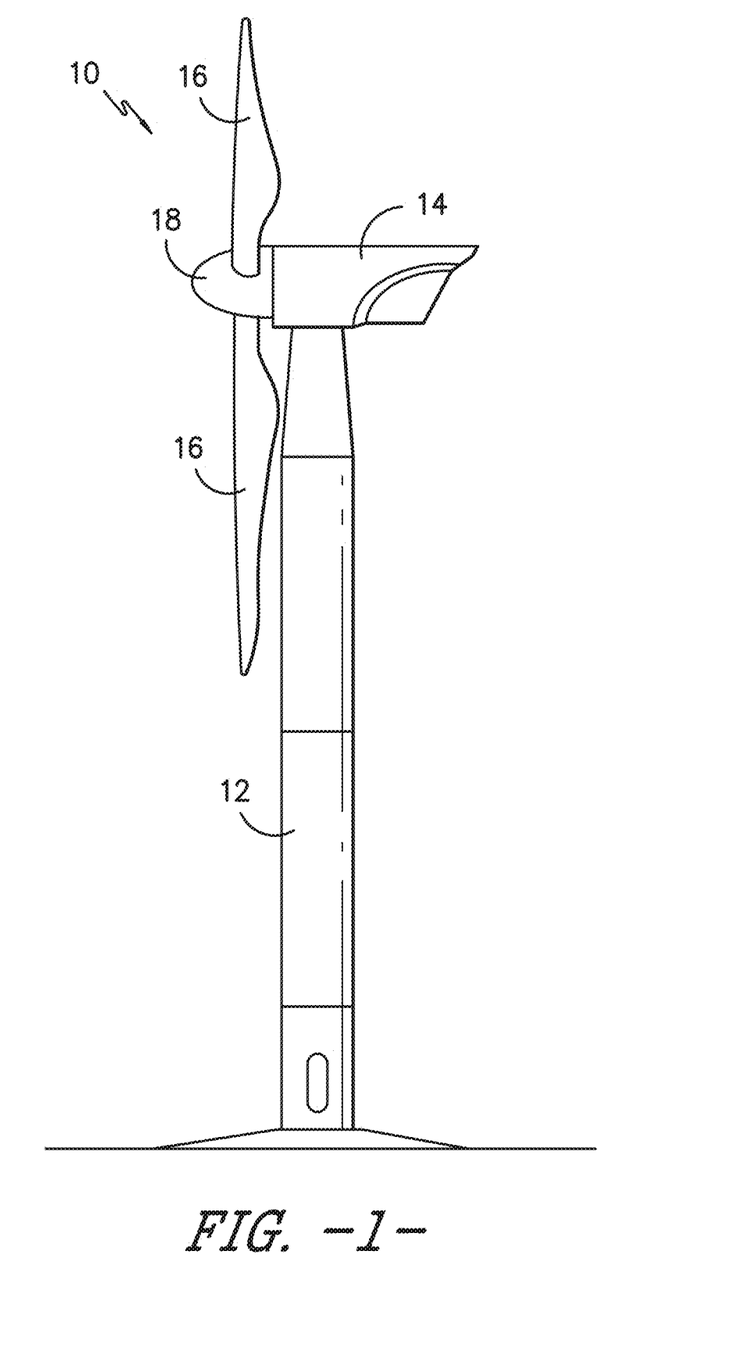
FIG. 1 illustrates a perspective view of one embodiment of a wind turbine according to the present disclosure.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having any suitable blade structure, such as e.g. propellers and engine blades.

Figure 2:
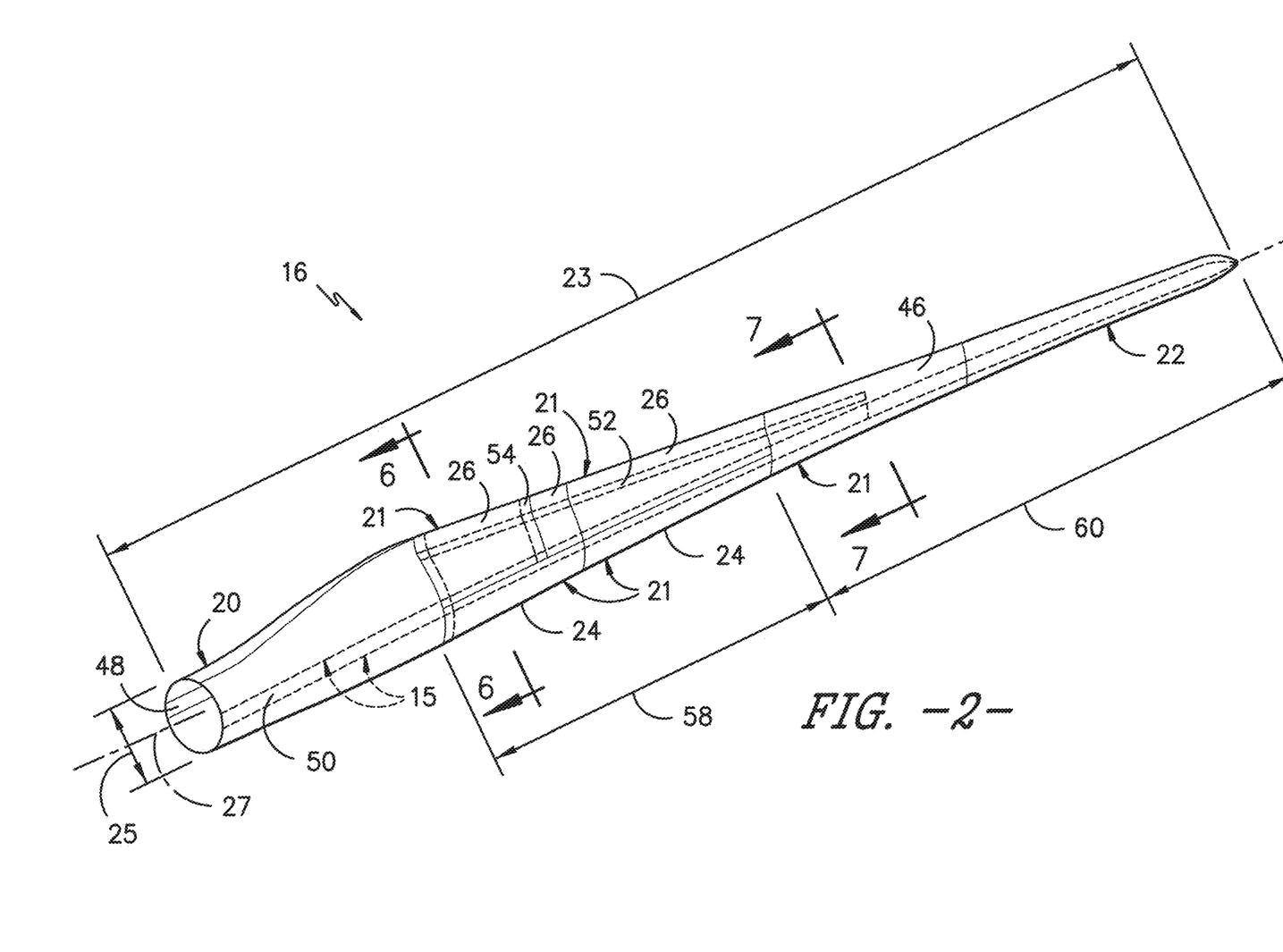
FIG. 2 illustrates a perspective view of one embodiment of a rotor blade of a wind turbine according to the present disclosure.
Figure 3:
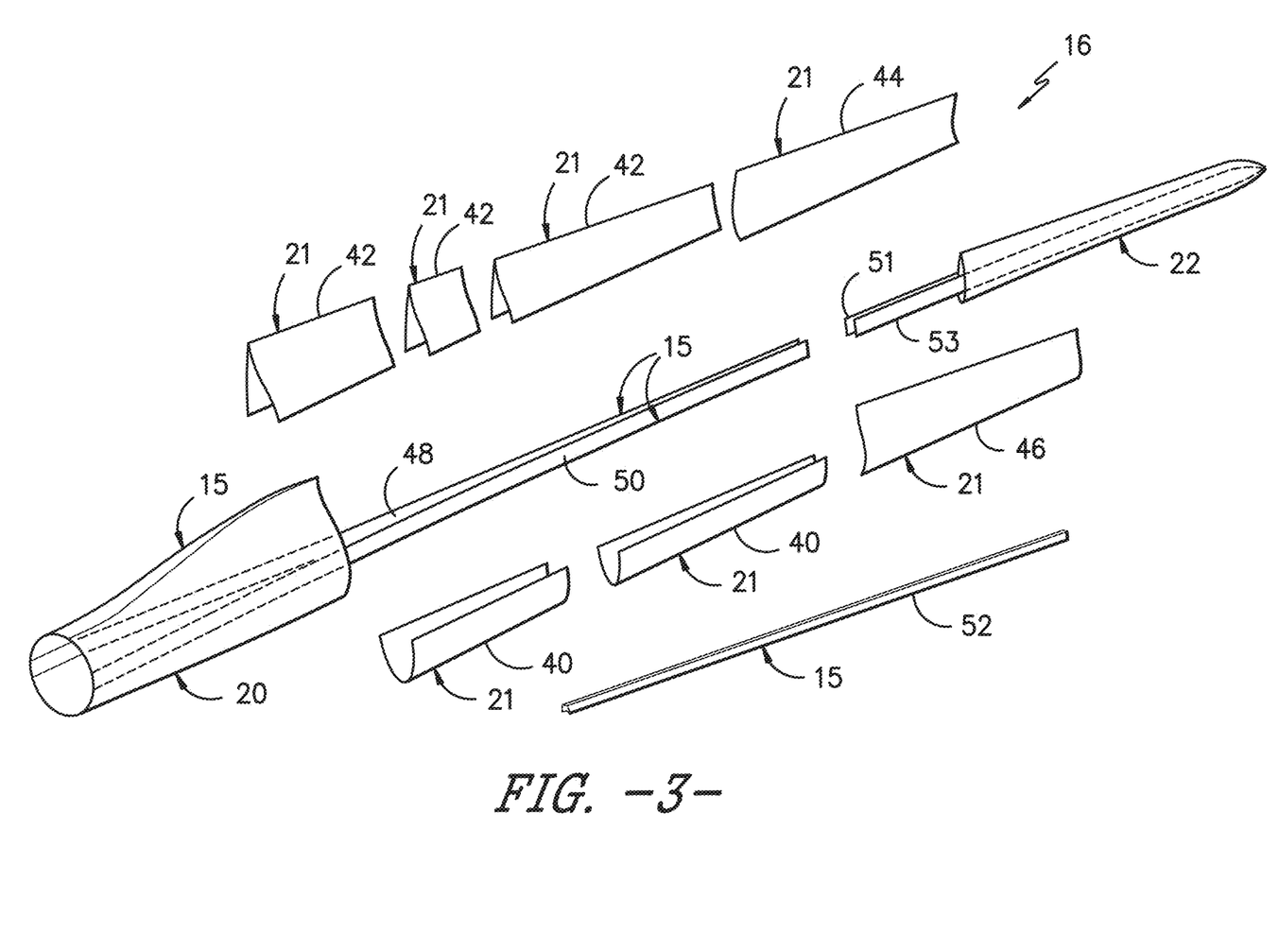
FIG. 3 illustrates an exploded view of the modular rotor blade of FIG. 2.

Referring now to FIGS. 2 and 3, various views of a rotor blade 16 according to the present disclosure are illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 constructed, at least in part, from a thermoset and/or a thermoplastic material and at least one blade segment 21 configured with the main blade structure 15. More specifically, as shown, the rotor blade 16 includes a plurality of blade segments 21. The blade segment(s) 21 may also be constructed, at least in part, from a thermoset and/or a thermoplastic material.

The thermoplastic rotor blade components and/or materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluoropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. For example, in one embodiment, a semi-crystalline thermoplastic resin that is modified to have a slow rate of crystallization may be used. In addition, blends of amorphous and semi-crystalline polymers may also be used.

Further, the thermoset components and/or materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as mentioned, the thermoplastic and/or the thermoset material as described herein may optionally be reinforced with a fiber material, including but not limited to glass fibers, carbon fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. Further, the fiber content may vary depending on the stiffness required in the corresponding blade component, the region or location of the blade component in the rotor blade 16, and/or the desired weldability of the component.

Figure 6:
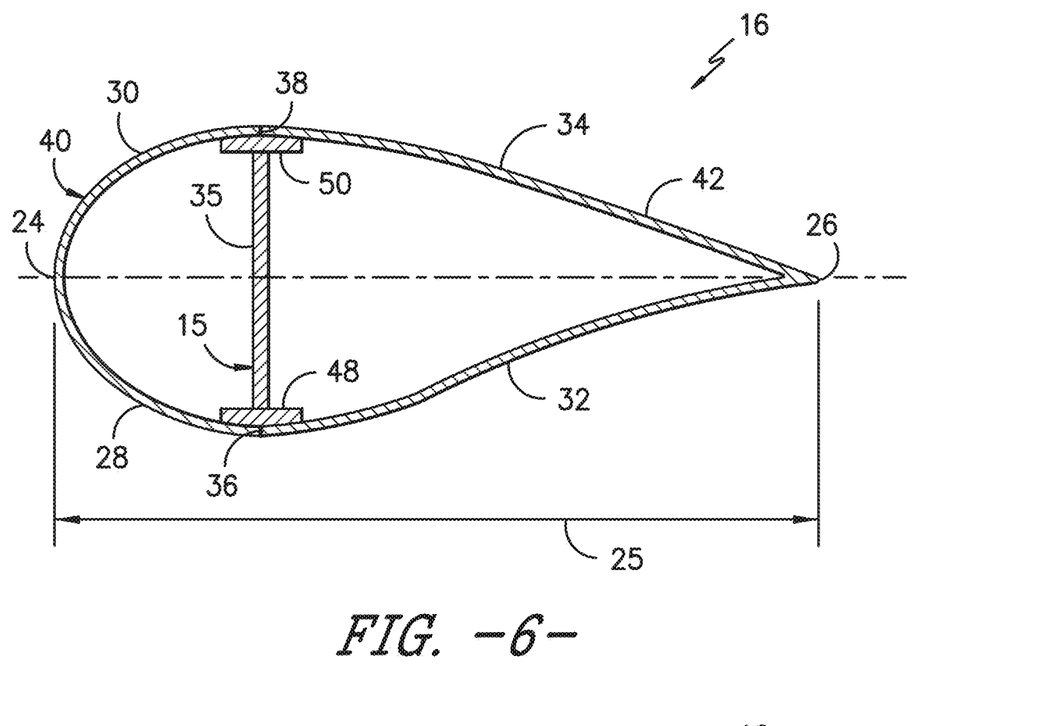
FIG. 6 illustrates a cross-sectional view of the modular rotor blade of FIG. 2 according to the present disclosure along line 6-6.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 24 of the rotor blade 16 and a trailing edge 26 of the rotor blade 16. As is generally understood, the chord 25 may generally vary in length with respect to the span 23 as the rotor blade 16 extends from the blade root section 20 to the blade tip section 22.

Figure 4:
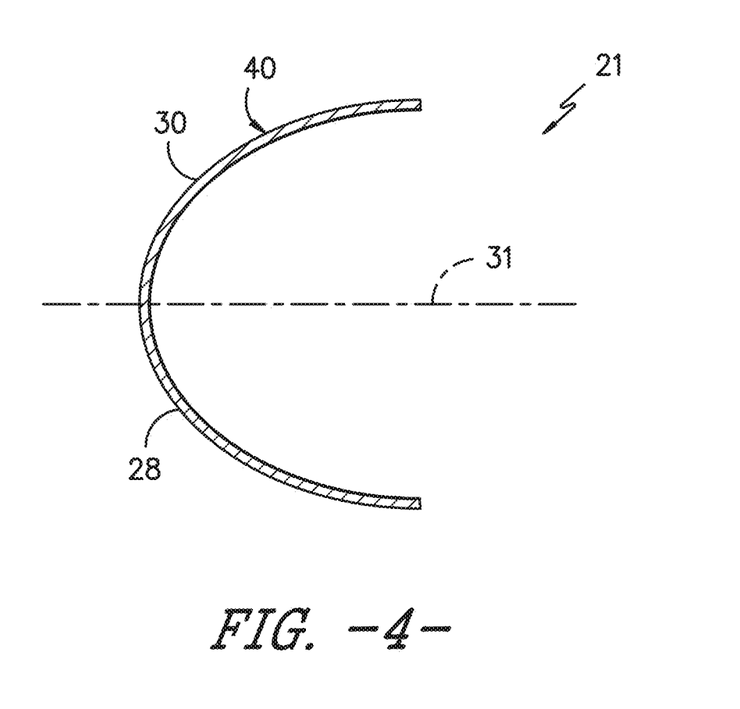
FIG. 4 illustrates a cross-sectional view of one embodiment of a leading edge segment of a modular rotor blade according to the present disclosure.

Referring particularly to FIGS. 2-4, any number of blade segments 21 or panels having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. In addition, the blade panels 21 may include any one of or combination of the following: pressure and/or suction side segments 44, 46, (FIGS. 2 and 3), leading and/or trailing edge segments 40, 42 (FIGS. 2-6), a non-jointed segment, a single-jointed segment, a multi-jointed blade segment, a J-shaped blade segment, or similar.

Figure 5:
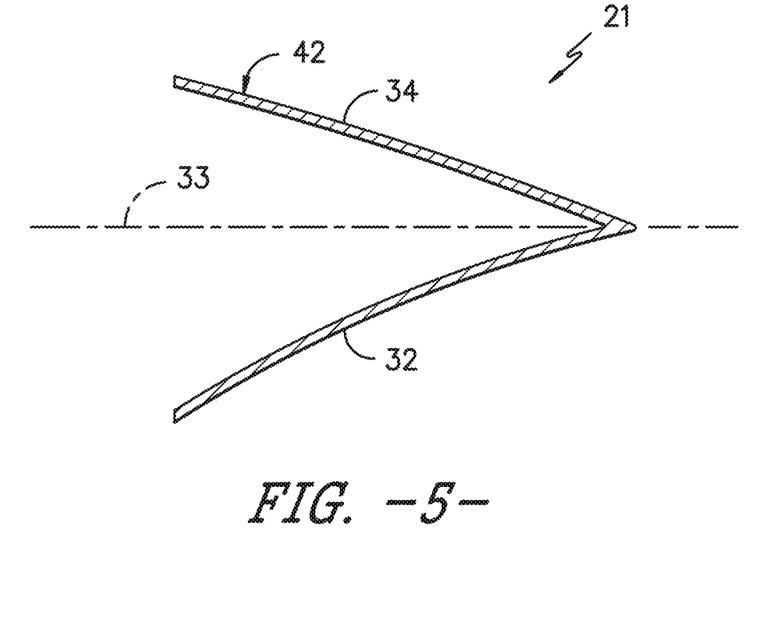
FIG. 5 illustrates a cross-sectional view of one embodiment of a trailing edge segment of a modular rotor blade according to the present disclosure.

More specifically, as shown in FIG. 4, the leading edge segments 40 may have a forward pressure side surface 28 and a forward suction side surface 30. Similarly, as shown in FIG. 5, each of the trailing edge segments 42 may have an aft pressure side surface 32 and an aft suction side surface 34. Thus, the forward pressure side surface 28 of the leading edge segment 40 and the aft pressure side surface 32 of the trailing edge segment 42 generally define a pressure side surface of the rotor blade 16. Similarly, the forward suction side surface 30 of the leading edge segment 40 and the aft suction side surface 34 of the trailing edge segment 42 generally define a suction side surface of the rotor blade 16. In addition, as particularly shown in FIG. 6, the leading edge segment(s) 40 and the trailing edge segment(s) 42 may be joined at a pressure side seam 36 and a suction side seam 38. For example, the blade segments 40, 42 may be configured to overlap at the pressure side seam 36 and/or the suction side seam 38. Further, as shown in FIG. 2, adjacent blade segments 21 may be configured to overlap at a seam 54. Thus, where the blade segments 21 are constructed at least partially of a thermoplastic material, adjacent blade segments 21 can be welded together along the seams 36, 38, 54, which will be discussed in more detail herein. Alternatively, in certain embodiments, the various segments of the rotor blade 16 may be secured together via an adhesive (or mechanical fasteners) configured between the overlapping leading and trailing edge segments 40, 42 and/or the overlapping adjacent leading or trailing edge segments 40, 42.

In specific embodiments, as shown in FIGS. 2-3 and 6-7, the blade root section 20 may include one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 22 may include one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In addition, the spar caps 48, 50, 51, 53 may be constructed of any suitable materials, e.g. a thermoplastic or thermoset material or combinations thereof. Further, the spar caps 48, 50, 51, 53 may be pultruded from thermoplastic or thermoset resins. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 48, 50, 51, 53 may be formed of the same pre-cured composites or different pre-cured composites. In addition, the pultruded components may be produced from rovings, which generally encompass long and narrow bundles of fibers that are not combined until joined by a cured resin.

Figure 7:
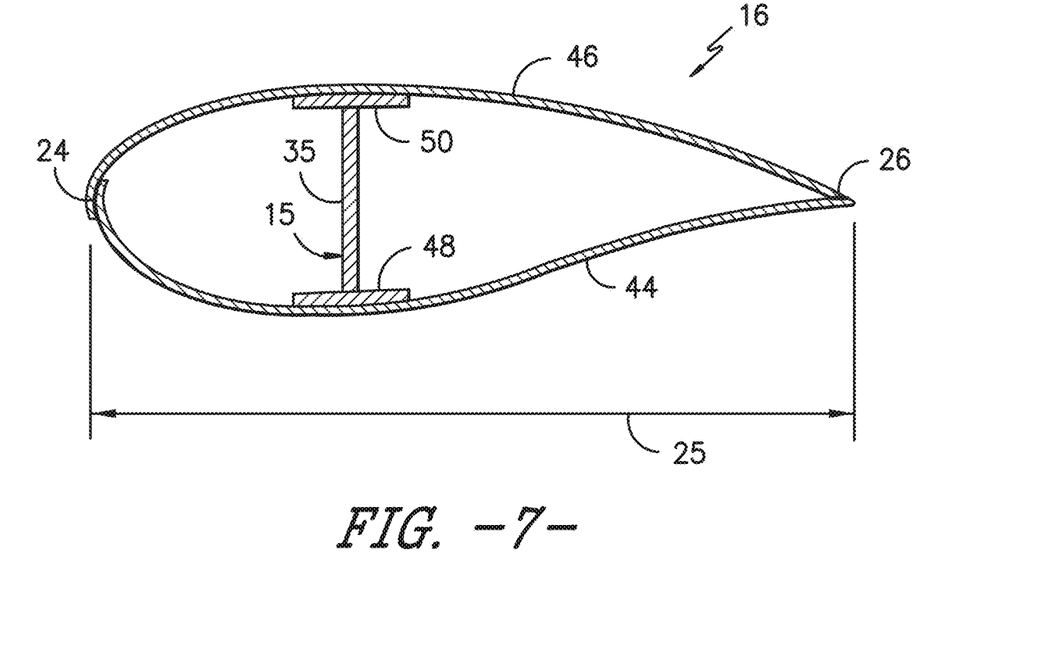
FIG. 7 illustrates a cross-sectional view of the modular rotor blade of FIG. 2 according to the present disclosure along line 7-7.

Referring to FIGS. 6-7, one or more shear webs 35 may be configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20.

In addition, as shown in FIGS. 2 and 3, the additional structural component 52 may be secured to the blade root section 20 and extend in a generally span-wise direction so as to provide further support to the rotor blade 16. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 40, 42 can be mounted thereto.

In general, the blade segments may comprise an outer layer or an outer coating that may be formed from any suitable shape-memory alloy that allows the blade segments to function as described herein. However, in a particular embodiment, the shape-memory alloy includes a metal-based shape memory alloy. For instance, a suitable metal-based shape memory alloy may include, but is not limited to, a nickel-titanium (NiTi) alloy, a NiTi-based alloy (e.g., a nickel-titanium-hafnium (NiTiHf) alloy, a nickel-titanium-vanadium (NiTiVd) alloy, a nickel-titanium-palladium (NiTiPd) alloy, a nickel-titanium-copper (NiTiCu), a nickel-titanium-niobium (NiTiNb) alloy), a nickel-aluminum-copper (Ni—Al—Cu) alloy and other non-nickel based alloys, such as titanium-niobium (Ti—Nb) alloys, copper-zinc-aluminum (CuZnAl) alloys, and copper-aluminum-beryllium (CuAlBe) alloys.

Shape memory alloys typically exist in several different temperature-dependent phases. Two of these phases are the martensite and austenite phases. Generally, the martensite phase generally refers to the more deformable, lower temperature phase whereas the austenite phase generally refers to the more rigid, higher temperature phase. In one embodiment, the shape memory alloy comprises a composition selected to exhibit a martensitic phase at an environmental temperature in which the rotor blade structure is disposed or operated. In another embodiment, the shape memory alloy comprises a composition selected to exhibit an austenite phase at an environmental temperature in which the rotor blade structure is disposed or operates and a martensite phase at about a temperature lower than the environmental temperature or operating temperature. Generally, the shape memory alloys are soft and easily deformable in their martensitic phase and are hard, stiff, and/or rigid in the austenitic phase. These shape memory alloys present non-linear behavior under mechanical stress due to a reversible austenite/martensite phase change taking place within a crystal lattice of the shape memory alloy material. In some embodiments, the shape memory alloys can offer enhanced protection even when not undergoing stress induced transformation from austenite to martensite. For example, in certain embodiments, the shape memory alloy may undergo a martensite to martensite change.

It should be appreciated that, in several embodiments, the shape memory alloy utilized in accordance with aspects of the present subject matter may be selected such that the rotor blade structure undergoes recoverable deformation when the rotor blade structure is exposed to certain environmental conditions. The shape memory alloy may undergo a large strain (e.g., for NiTi typically in the range of 2% to 4%), thereby allowing the shape memory alloy to deform and provide reduced stiffness. The shape memory alloy may undergo a solid-solid phase transformation from austenite to martensite. Additionally, the shape memory alloy may recover all the strain once the load drops below a second load threshold, thereby allowing the shape memory alloy to return back to its initial shape and provide increased stiffness. In this regard, the shape memory alloy may undergo transformation from martensite to austenite. It should be appreciated that the material properties of the shape memory alloy used herein may be selected such that the first load threshold is less than, equal to or greater than the predetermined load threshold, depending on the desired performance of the blade structure.

Furthermore, the deformation of the shape memory alloy may provide very high damping. The shape memory alloy composition may provide damping for the rotor blade under various loading conditions. For example, the shape memory alloy coating may be configured to deform from a normal state to a deformed state when experiencing a higher than normal pressure due to application of a high load, such as in the event of exposure to an environmental condition, such as foreign object impact. Depending on the position, size, shape, pre-working, or combinations thereof the shape memory alloy coating, the shape memory alloy coating may be configured to be stretched to various degrees and in required directions. In some embodiments, the shape memory alloy coating provides variable stiffness, high damping, or both variable stiffness and high damping to the blade.

The damping obtained by the present of the shape memory alloy is in general much higher when compared to traditional dampers, as the damping obtained by the shape memory alloy blade is a result of the deformation of the shape memory alloy through a phase transition. This deformation of the shape memory alloy may provide high damping forces by absorbing excess load that is transferred to them. In addition, the shape memory alloy may provide high support stiffness under low or reduced loading conditions and low support stiffness under high or increased loading conditions. Such suitable properties of the shape memory alloy allow for recoverable relative motion of the shape memory alloy coating with high damping. This helps in maintaining the blade structure during exposure of the blade to environmental events, such as erosion, corrosion, or foreign object impact.

Figure 8:
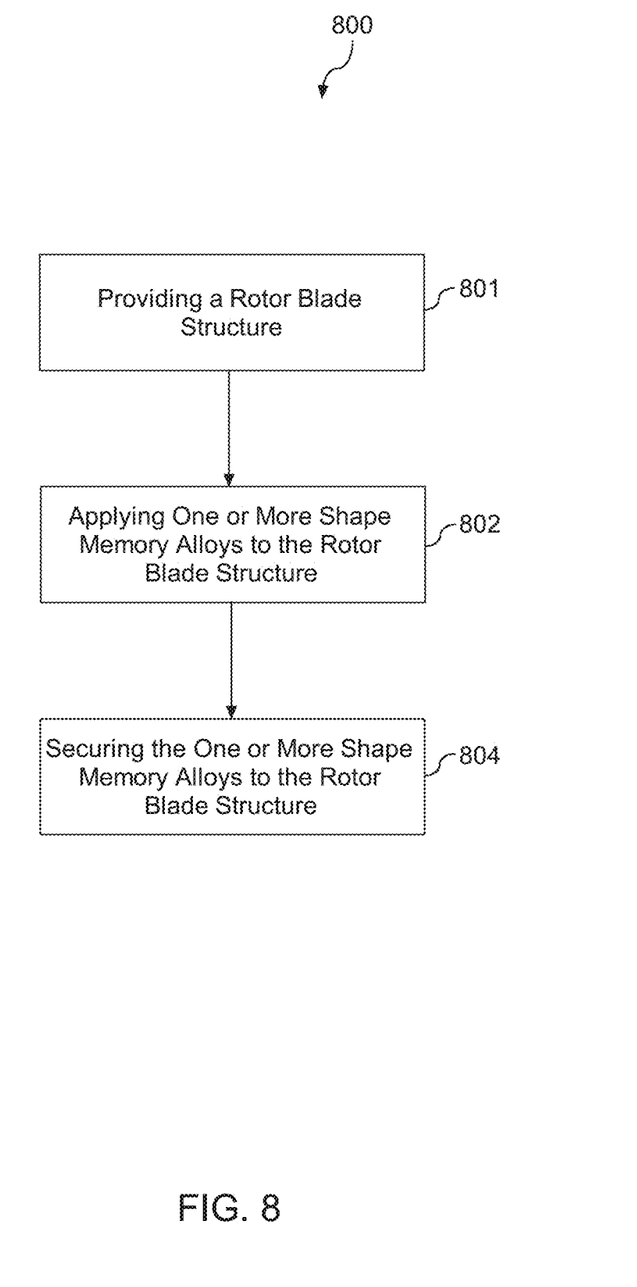
FIG. 8 illustrates a flow diagram of one example embodiments of a method for manufacturing an outer protective layer on a rotor blade structure.

Referring now to FIG. 8, the present disclosure is directed to methods (800) for manufacturing an outer protection layer of a rotor blade structure. At (801) the method include providing a rotor blade structure.

At, (802) the method comprises applying one or more shape memory alloys to the outer surface of the rotor blade structure. In some embodiments, the shape memory alloy may be applied to certain sections of the rotor blade structure. For example, in some embodiments, the shape memory alloy may be applied to the blade segments 21. Still in certain other embodiments, the shape memory alloy may be applied to the formed blade tip section 22. Still in certain embodiments, the shape memory alloy may be applied to portions of the leading or trailing edge segments 40,42.

In some embodiments, one or more shape memory alloys can be applied to the rotor blade structure by coating the outer surface of the rotor blade structure with a coating comprising one or more shape memory alloys. In certain embodiments, only certain sections of the rotor blade structure may be coated with a shape memory alloy composition. For example, in some embodiments, the blade segments 21 may be coated with a coating containing one or more shape memory alloys. Still in certain other embodiments, the formed blade tip section 22 may be coated with a coating containing one or more shape memory alloys. Still in certain embodiments, the leading or trailing edge segments 40,42 may be coated with a composition containing one or more shape memory alloys.

In some embodiments, application of the shape memory alloy composition onto the blade structure provides resistance to liquid and particulate erosion. For example, during operation of the rotor blade structure, particles and/or liquid droplets impact the surfaces of various components and may erode the surface. However, coating these surfaces with the shape memory alloy as provided herein, the deformation caused by impacting particles or liquid droplets may be absorbed by the shape memory alloy coating, thereby minimizing erosion and/or wear. The deformation caused by the impacting particles or liquid droplets can then be removed by altering the transformation phase of the shape memory alloy so as to restore the surface to its original shape, i.e., without deformation.

The one or more shape memory alloys may be applied to the rotor blade structure via any application method suitable in the art. In certain embodiments, the one or more shape memory alloys may be contained in a liquid suspension that is spray coated on the rotor blade structure. In other embodiments, the shape memory alloy is contained within a liquid composition comprising a suspension of a suitable carrier and one or more shape memory alloys. In certain embodiments, the one or more shape memory alloys may be contained within a powder composition. shape memory alloy coating is a powder composition. The one or more shape memory alloys may be present in a composition that may include additional suitable additives and fillers.

The thickness of the shape memory alloy is chosen to provide resiliency and flexibility to those surfaces prone to erosion by particles and/or liquid. As such, the thickness of the shape memory alloy coating should also be of a thickness effective to provide the desired shape memory effect. Suitable thicknesses are about 0.5 mils to about 2 inches, with about 200 mils to about 1 inch more preferred.

In some embodiments, the one or more shape memory alloys may also include shape memory alloy composites, wherein the shape memory alloy based composites comprises a matrix of shape memory alloy and at least one hard particulate phase. The hard particulate phase comprises borides, oxides, nitrides, carbides, or combinations comprising at least one of the foregoing particulates. Alternatively, the shape memory alloy composites comprises a multilayer structure of the shape memory alloy alternating with a metallic or a ceramic layer with the same or different thickness as the shape memory alloy layer. The ceramic layer is preferably selected from the group consisting of borides, oxides, nitrides, carbides, TiN, Y2O3, and TaC. The metallic layer is preferably selected from the group consisting of Ti, Ni, Co, Ti-based alloys, Ni-based alloys, Co-based alloys, Fe-based alloys, and the like. In yet another alternative embodiment, the composite may further include ultra-fine grained materials such as may be produced by severe plastic deformation processes generally known by those skilled in the art. For example, suitable severe plastic deformation processes for obtaining the desired grains sizes include, but are not intended to be limited to, ball milling, impact deformation, shot peening, high pressure torsion processing, and the like. Preferred grain sizes are less than 2 micrometers, with grain sizes less than 1 micrometer more preferred, and with grain sizes less 100 nanometers even more preferred. Suitable ultra-fine grained materials are characterized by high hardness, no recrystallization, slow grain growth upon annealing, and low dislocation density interior of grains. While not wanting to be bound by theory, it is believed that the ultra-fine grained materials in the composite will prevent and/or deflect propagation of cracks within the coating.

At, (804) the method comprises securing the one or more shape memory alloys to the rotor blade structure. In some embodiments, the one or more shape memory alloys may be secured to the rotor blade structure via an adhesive or tape. Suitable adhesives include epoxy, polyester, vinyl ester, urethanes, and silicones.

In some embodiments, the coating containing one or more shape memory alloys may be bonded or co-bonded to the rotor blade structure via any suitable bonding or co-bonding process. The coating containing the shape memory alloy can be affixed to the rotor blade by means of metallurgical bonding. The specific method of metallurgical bonding will depend on shape memory alloy composition, the alloy composition of the rotor blade, as well as other parameters. Suitable methods include, but are not intended to be limited to, brazing, extrusion, explosion bonding, hot-isotactic-pressing (HIP), cladding, laser processes, plasma transfer arc processes, ion plasma deposition, forging, fusion welding, vacuum plasma spraying, thermally spraying, friction-stir welding, and the like. Optionally, the shape memory alloy coating can be formed into an insert and/or coupon, which can then be attached to the turbine component. For example, in certain embodiments a sheet containing one or more shape memory alloys and/or a foil is placed in the mold followed by standard wind blade vacuum assisted resin infusion molding (VARIM) in order to have co-bonding of the shape memory alloy on to the blade structure, such as on the leading edge of the wind blade.

In some embodiments, the coating containing one or more shape memory alloys may be secured to the rotor blade structure via a suitable laminating process including vacuum assisted resin infusion molding process of lamination.

In some embodiments, securing the one or more shape memory alloys to the rotor blade structure may include any of the following processes or combinations of processes: brazing, welding, thermally spraying, laser consolidation, plasma transfer arc, hot rolling, cold rolling, ion plasma deposition, forging, explosion welding, fusion welding, friction stir welding, and cladding.

In some embodiments, a vapor grown shape memory alloy coating can be deposited directly from a gas phase onto a surface of the rotor blade structure to form an integral coating.

Optionally, in certain embodiments, the method includes applying a sheet on the outer surface of the rotor blade structure before coating the rotor blade structure with the shape memory alloy composition disclosed herein. Indeed, in this embodiment, the sheet may include a metal sheet formed of any suitable metal including, but not limited to, nickel, titanium, steel, aluminum, and alloys thereof. In some embodiments, the metal sheet has a thickness ranging from about 0.25 mm to about 2 mm.

While certain example embodiments described herein may be directed to the use of the blade structure in a wind turbine, it is to be understood that the blades disclosed herein may be used in any suitable blade application in addition to wind turbines, such as aviation engine blades, gas turbine engine blades, power turbine engine blades, propeller blades, and/or hydro-turbine blades. The blade structure disclosed herein may be used in propellers for helicopters or similar as well as marine applications.

In one aspect, the present disclosure is directed to a gas turbine engine. The gas turbine engine includes a rotatable drum rotor having a plurality of blades secured thereto. In certain embodiments, the plurality of blades may comprise the blades disclosed herein that have been coated with the shape memory alloy composition according to example aspects of the present disclosure. The blades extend radially inward of the rotatable drum rotor. The gas turbine engine also includes a support frame mounted radially outward of the rotating drum rotor and a rotor support system having a bearing assembly positioned between the rotatable drum rotor and the support frame.

Example 1

Example 1 illustrates the leading edge protection provided by a coating containing one or more shape memory alloys according to example embodiments of the present disclosure.

Figure 9:
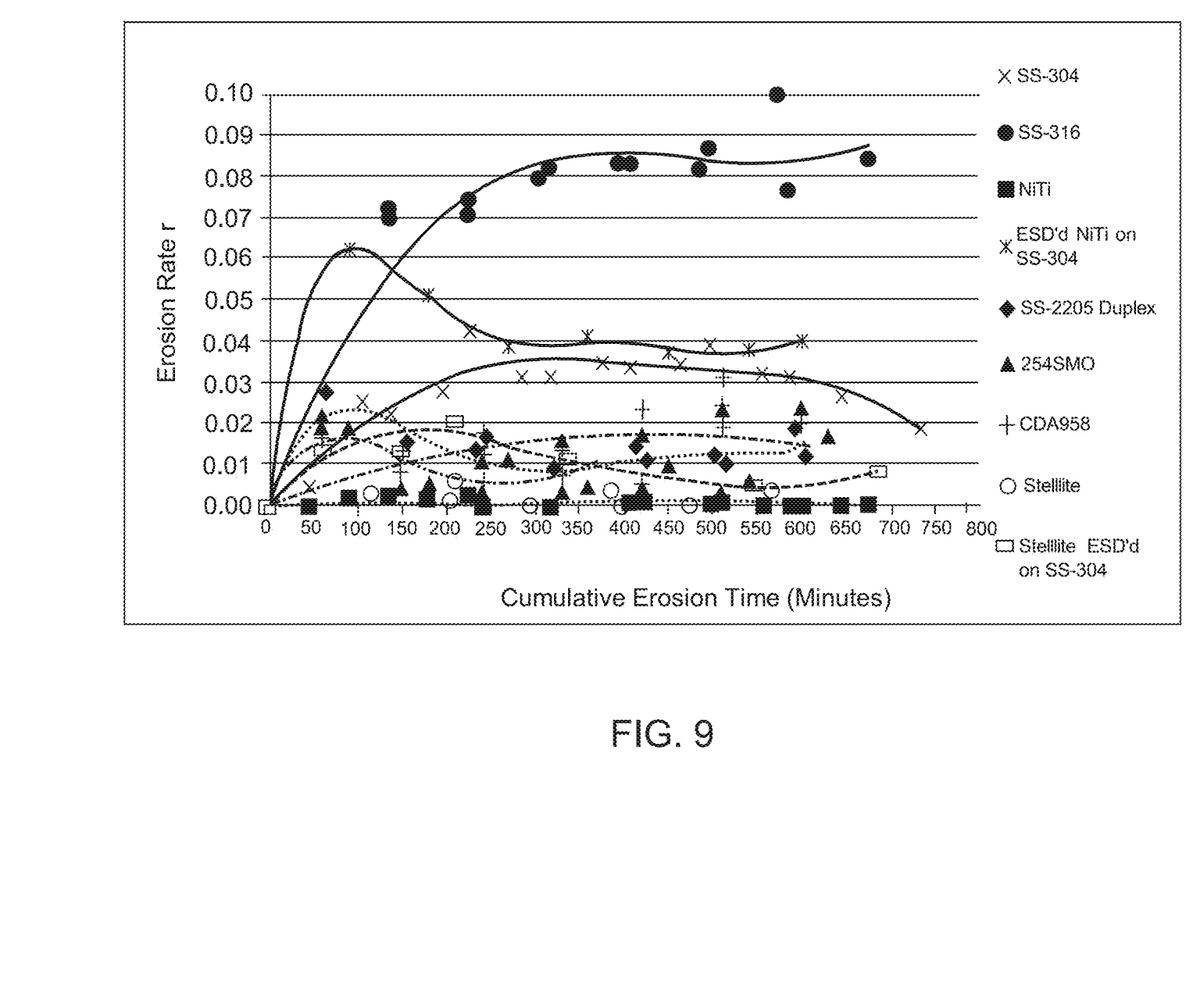
FIG. 9 illustrates the erosion rate for certain materials, including shape memory alloys, versus the cumulative erosion time.

As shown in FIG. 9, NiTi exhibited excellent erosion resistance compared to other tested materials, i.e. Stellite. Furthermore, the NiTi composition is much lighter compared to coatings containing SS-316, Stellite and Ni, which may provide added benefits such as increased performance and cost savings. Additionally, the compositions containing NiTi ma provide additional damping functionality for enhanced life and performance of the rotor blade structure.

Figure 10:
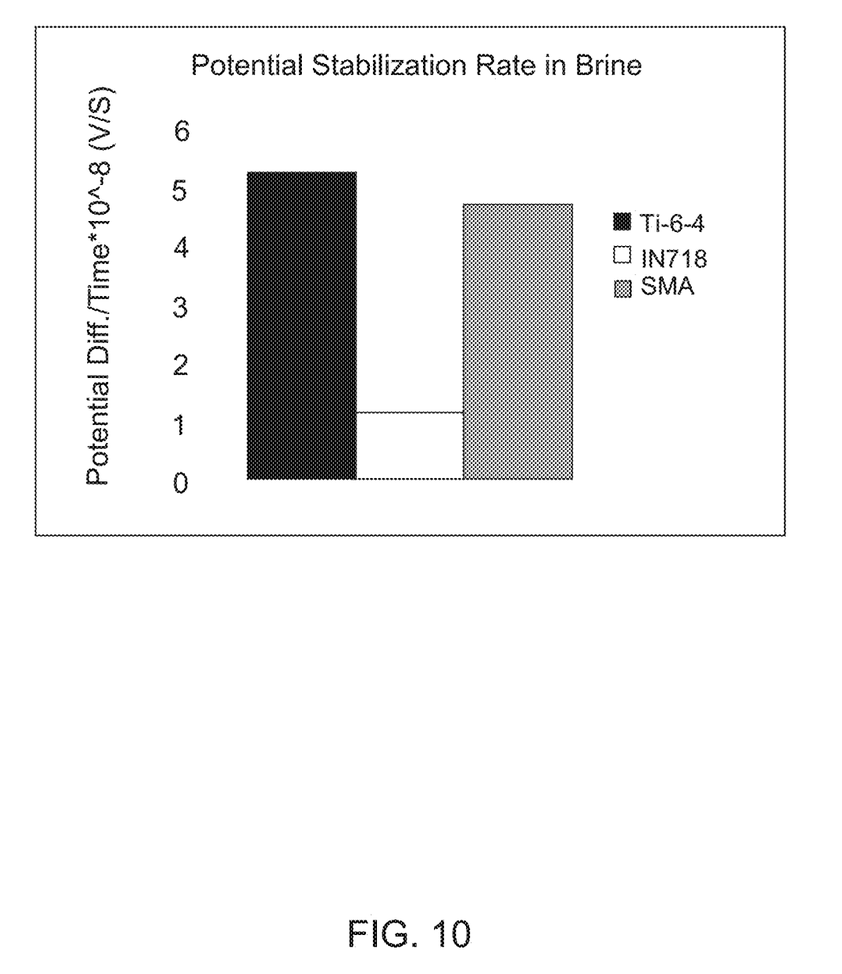
FIG. 10 illustrates the corrosion potential stability rate for shape memory alloy compared to Ti-6-4 and IN718.

FIG. 10 illustrates the corrosion potential stability rate for shape memory alloy compared to Ti-6-4 and IN718. The corrosion medium was seawater having a pH of 7 and the reference electrode was saturated calomel. As shown, the shape memory allow potential stabilization rate is similar to Ti-6-4.

Figure 11:
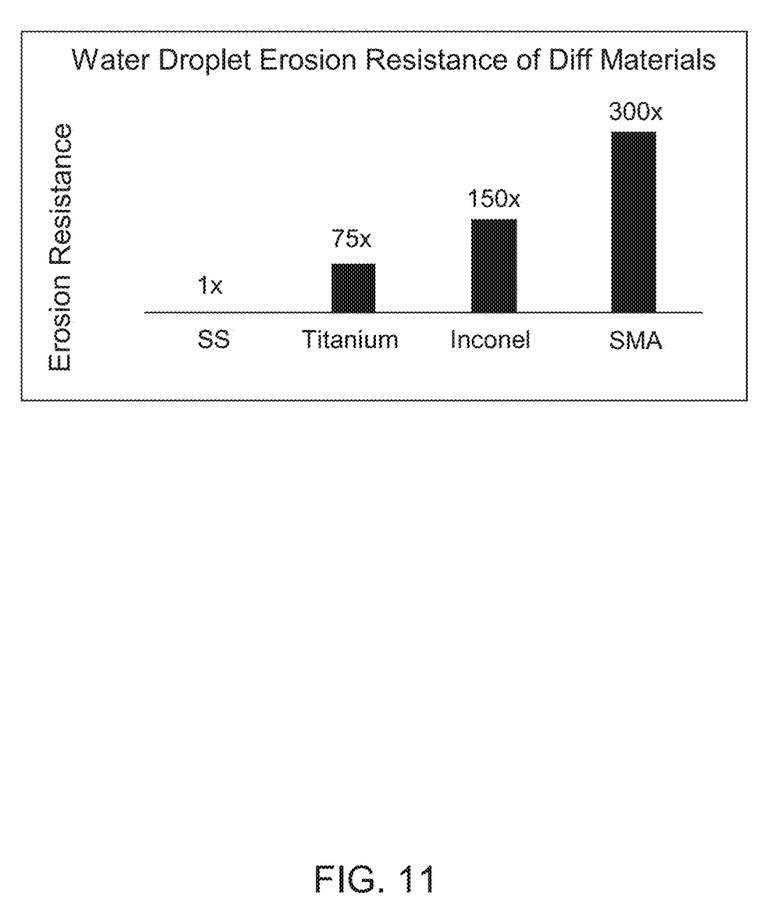
FIG. 11 illustrates the erosion resistance under water droplet impact of shape memory alloys.

FIG. 11 illustrates the erosion resistance under water droplet impact of stainless steel, titanium, Iconel, and the shape memory alloy. As shown, the shape memory alloy has significantly greater erosion resistance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a blade structure for a wind turbine, the method comprising:
   providing the blade structure comprising an outer surface having an aerodynamic profile;
   applying a sheet on the outer surface of the blade structure, wherein the sheet has a thickness ranging from about 0.25 millimeters (mm) to about 2 mm;
   applying one or more shape memory alloys to the outer surface of the blade structure so as to form an outer protection layer on at least a portion of the blade structure, wherein applying the one or more shape memory alloys comprises coating the outer surface of the blade structure with a coating comprising the one or more shape memory alloys, wherein the sheet is applied before applying the one or more shape memory alloys; and
   securing the one or more shape memory alloys to the blade structure.

2. The method of claim 1, wherein the one or more shape memory alloys comprises a nickel-titanium (NiTi) alloy, a NiTi-based alloy (e.g., a nickel-titanium-hafnium (NiTiHf) alloy, a nickel-titanium-vanadium (NiTiVd) alloy, a nickel-titanium-palladium (NiTiPd) alloy, a nickel-titanium-copper (NiTiCu), a nickel-titanium-niobium (NiTiNb) alloy), a nickel-aluminum-copper (Ni—Al—Cu) alloy and other non-nickel based alloys, such as titanium-niobium (Ti—Nb) alloys, copper-zinc-aluminum (CuZnAl) alloys, and copper-aluminum-beryllium (CuAlBe) alloys.

3. The method of claim 2, wherein the one or more shape memory alloys comprise the nickel-titanium (NiTi) alloy.

4. The method of claim 1, wherein the sheet is comprised of nickel, titanium, aluminum, steel, or alloys thereof.

5. The method of claim 1, wherein joining the one or more shape memory alloys to the blade structure comprises bonding the one or more shape memory alloys to the blade structure via an adhesive.

6. The method of claim 1, wherein joining the one or more shape memory alloys to the blade structure comprises bonding the one or more shape memory allows to the rotor blade with a tape.

7. The method of claim 1, wherein joining the one or more shape memory alloys to the blade structure comprises co-bonding the one or more shape memory alloys to the rotor blade.

8. The method of claim 7, wherein the co-bonding comprises vacuum assisted resin infusion molding.

9. The method of claim 1, wherein joining the one or more shape memory alloys to the blade structure comprises curing the one or more shape memory alloys to the blade structure during a lamination process.

10. The method of claim 1, wherein applying one or more shape memory alloys to the outer surface of the blade structure so as to form the outer protection layer on the blade structure comprises applying one or more shape memory alloys to a leading edge of the outer surface of the blade structure.

11. A rotor blade structure for a wind turbine, the rotor blade structure comprising:
    a rotor blade comprising an outer surface that defines an aerodynamic profile;
    a sheet applied on the outer surface of the blade structure, wherein the sheet has a thickness ranging from about 0.25 millimeters (mm) to about 2 mm;
    an outer protection layer formed of one or more shape memory alloys, wherein the outer protection layer is adhered to at least a portion of the outer surface of the rotor blade so as to protect the outer surface of the rotor blade, wherein the outer protection layer comprises a coating applied to the outer surface, wherein the sheet is applied before applying the one or more shape memory alloys.

12. The rotor blade structure of claim 11, wherein the one or more shape memory alloys comprises a nickel-titanium (NiTi) alloy, a NiTi-based alloy (e.g., a nickel-titanium-hafnium (NiTiHf) alloy, a nickel-titanium-vanadium (NiTiVd) alloy, a nickel-titanium-palladium (NiTiPd) alloy, a nickel-titanium-copper (NiTiCu), a nickel-titanium-niobium (NiTiNb) alloy), a nickel-aluminum-copper (Ni—Al—Cu) alloy and other non-nickel based alloys, such as titanium-niobium (Ti—Nb) alloys, copper-zinc-aluminum (CuZnAl) alloys, and copper-aluminum-beryllium (CuAlBe) alloys.

13. The rotor blade structure of claim 11, wherein the one or more shape memory alloys comprise a nickel-titanium (NiTi) alloy.

14. The rotor blade structure of claim 11, wherein the outer protection layer is adhered to the outer surface of the rotor blade with adhesive.

15. The rotor blade structure of claim 14, wherein the adhesive comprises epoxy, polyester, vinyl ester, urethanes, silicones, or combinations thereof.

16. The rotor blade structure of claim 11, wherein the outer protection layer is adhered to the outer surface of the rotor blade via a curing process.

\* \* \* \* \*